United States Patent [19]

Watada et al.

[11] Patent Number: 4,797,331
[45] Date of Patent: * Jan. 10, 1989

[54] MAGNETO-OPTICAL RECORDING MATERIAL

[75] Inventors: Atsuyuki Watada, Numazu; Fumiya Ohmi, Yokohama, both of Japan

[73] Assignee: Ricoh Company, Ltd., Tokyo, Japan

[*] Notice: The portion of the term of this patent subsequent to Sep. 1, 2004 has been disclaimed.

[21] Appl. No.: 928,378

[22] Filed: Nov. 10, 1986

[30] Foreign Application Priority Data

Nov. 19, 1985 [JP] Japan .................. 60-259384

[51] Int. Cl.$^4$ ............................... G11B 7/24
[52] U.S. Cl. .................... 428/694; 252/62.56;
252/62.63; 369/288; 428/697; 428/702;
428/900
[58] Field of Search ........... 428/694, 697, 702, 900;
369/13, 288; 365/122; 360/131, 135; 252/62.56,
62.63

[56] References Cited

U.S. PATENT DOCUMENTS

| 4,543,198 | 9/1985 | Kamiyama | 252/62.59 |
| 4,544,602 | 10/1985 | Kobayashi et al. | 428/336 |
| 4,562,105 | 12/1985 | Machida et al. | 428/161 |

FOREIGN PATENT DOCUMENTS

| 3413086 | 11/1984 | Fed. Rep. of Germany . |
| 3608021 | 9/1986 | Fed. Rep. of Germany . |
| 199722 | 11/1983 | Japan . |
| 45644 | 3/1984 | Japan . |
| 133711 | 7/1985 | Japan . |
| 152010 | 8/1985 | Japan . |
| 164303 | 8/1985 | Japan . |
| 180920 | 9/1985 | Japan . |
| 136683 | 6/1986 | Japan . |

Primary Examiner—Paul J. Thibodeau
Attorney, Agent, or Firm—Oblon, Fisher, Spivak, McClelland & Maier

[57] ABSTRACT

A magneto-optical recording material is disclosed, which consists of magnetoplumbite type ferrite containing barium in which part of Ba is replaced by La and part of Fe is replaced by Co.

6 Claims, 2 Drawing Sheets

Mr/Ms = 1

Mr/Ms = 0.7~0.9

Mr/Ms = 0.4~0.6

MAGNETO-OPTICAL RECORDING MATERIAL

BACKGROUND OF THE INVENTION

The present invention relates to a magneto-optical recording material for use in a recording layer of a magneto-optical recording medium.

Recently considerable attention is placed on a magneto-optical recording medium comprising a magnetic thin layer in which information is recorded by forming magnetic domains therein by utilizing the thermal effects caused by the light beams projected thereto and from which the recorded information is read out by utilizing the magneto-optical effect of the magnetic thin layer.

As a material for use in a conventional magneto-optical recording medium, various amorphous materials comprising rare-earth metals and transition metals are known. A magneto-optical recording medium in which a magnetic material made of such an amorphous alloy is employed is usually fabricated, for instance, by depositing a Tb-Fe alloy on a substrate such as a glass plate by vacuum evaporation or by sputtering to form a magnetic layer with a thickness of about 0.1~1 μm.

Such amorphous alloy magnetic materials, in particular, the rare-earth metal components contained therein, however, are so susceptible to oxidation and corrosion that they have the shortcomings that the magneto-optical characteristics of a magnetic film layer made of such an amorphous alloy magnetic material considerably deteriorate with time and the oxidation and corrosion of the magnetic film layer are accelerated by the light applied thereto and the heat generated therein at the time of recording information. Amorphous alloy magnetic materials have the further shortcoming that they are apt to be crystallized when heated, so that the magnetic characteristics easily deteriorate.

Further, a magnetic film made of an amorphous alloy magnetic material has a low transmittance ratio in the wavelength region of the laser beams for recording information, so that the recorded information is read out by utilizing the magneto-optical effect caused by the laser beams being reflected by the surface of the magnetic film layer, that is, the Kerr effect. However, the Kerr rotation angle thereof is generally so small that it has the shortcoming that the reproduction performance is low.

The inventors of the present invention previously proposed in Japanese Laid-Open Patent Application No. 59-45644 a magneto-optical recording medium including a magnetic layer comprising a magnetic material represented by a general formula (A) or a magnetic material represented by a general formula (B) in view of the fact that a magneto-plumbite type barium ferrite is excellent in the stability with time and in the transparency in the laser beam wavelength region, so that it is expected that the Faraday effect thereof can be utilized:

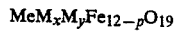

$$MeM_xM_yFe_{12-p}O_{19} \quad (A)$$

wherein Me represents at least one element selected from the group consisting of Ba, Pb, Sr and Sc, and M represents at least one element selected from the group consisting of Co, Mn, Ti, Zn, Al, Sn, Cu, Cr and Mg, p=x+y (y can be zero (0)), and $1.2 \leq p \leq 2$.

$$CoM_zFe_{2-z}O_4 \quad (B)$$

wherein M represents at least one element selected from the group consisting of Co, Mn, Ti, Zn, Al, Sn, Cu, Cr and Mg, and $0.75 \leq z \leq 1.3$.

$BaFe_{12}O_{19}$ has high magnetic anisotropy. However, its magneto-optical effect is so small that it cannot be used as magneto-optical recording material in practice.

The magneto-optical effect of $BaFe_{12}O_{19}$ can be significantly improved by replacing part of the Fe atoms in $BaFe_{12}O_{19}$ with Co atoms. However, in this case, charge compensation becomes necessary because 3-valence Fe is replaced by 2-valence Co. If charge compensation is performed by replacing part of Fe atoms with a 4-valence metal, the crystalline anisotropy decreases.

FIG. 4 and FIG. 5 show the above facts. In these figures, M represents a 4-valence metal, x and y each represent a substitution number, and $H_A$ represents the anisotropy field of the crystalline anisotropy.

Thus, when Co is added, the magnetic anisotropy decreases in the end. Therefore, there is a certain limitation to the amount of Co that can be used for such replacement. Thus, the magneto-optical effects cannot be sufficiently improved by more addition of Co. When the magnetic anisotropy is small within the range in which a film magnetized perpendicular to the plane thereof can be formed, the square ratio (residual magnetization (Mr)/saturation magnetization (Ms)) of the hysteresis loop of the magnetic film which is not subjected to demagnetizing field correction becomes improper. The result is that suitable characteristics for magneto-optical memory device cannot be obtained.

When recording of information is performed in a magneto-optical recording material by a light modulation system, it is required that the square ratio (hereinafter referred to as the Mr/Ms ratio) in the hysteresis loop be 1 in the case where no demagnetizing field correction is performed. When the Mr/Ms ratio is small, even if the Faraday rotation ($\theta_F$), which is a predominant magneto-optical effect in this case, is large, the available readout performance will be at most the Mr/Ms ratio $\times \theta_F$.

FIG. 6A shows an ideal hysteresis loop.

FIG. 6B shows the hysteresis loop of BaFe $O_{19}$.

FIG. 6C shows the hysteresis loop of a representative $BaCo_xM_yFe_{12-(x+y)}O_{19}$.

SUMMARY OF THE INVENTION

An object of the present invention is to provide a magneto-optical recording material which is excellent in the magneto-optical effect and magnetic anisotropy.

This object of the present invention is attained by a magnetoplumbite type ferrite containing barium in which part of Ba is replaced by La and part of Fe is replaced by Co.

DETAILED DESCRIPTION OF THE PREFERRED EMBODIMENTS

The magneto-optical recording material according to the present invention is a magnetoplumbite type ferrite containing barium in which part of Ba is replaced by La and part of Fe is replaced by Co.

In the present invention, part of Fe is replaced by Co and the charge compensation that must be done due to the above replacement is performed by partly replacing 2-valence Ba with 3-valence La, whereby the magneto-optical effect and the crystalline anisotropy are increased.

Figure 1:
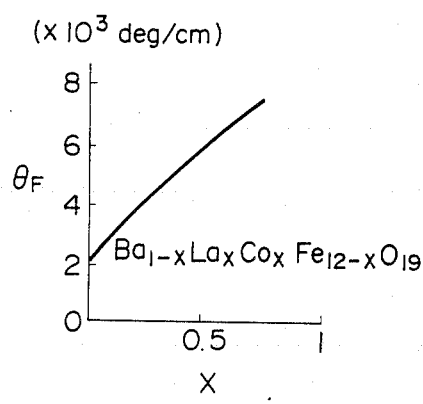
FIG. 1 is a graph showing the relationship between the Faraday rotation ($\theta_F$) and the number of substitution (x) of a magneto-optical recording material according to the present invention.

FIG. 1 is a graph showing the relationship between the Faraday rotation coefficient $\theta_F(\mu = 780$ nm) and the substitution number (x) of a magneto-optical recording material, $Ba_{1-x}La_xCo_xFe_{12-x}O_{19}$, according to the present invention.

Figure 2:
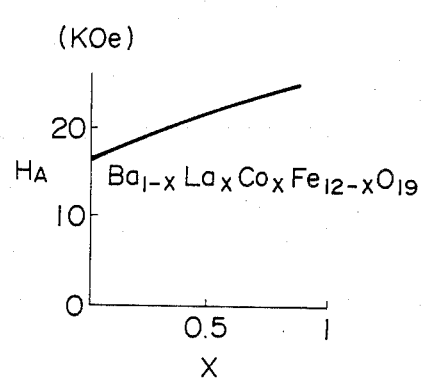
FIG. 2 is a graph showing the relationship between the anisotropy field of the crystalline anisotropy and the number of substitution (x) of the above magneto-optical recording medium.

FIG. 2 is a graph showing the relationship between the anisotropy field $H_A$ caused by the crystalline anisotropy and the number of substitution (x) of the above magneto-optical recording material.

These graphs indicate that both the Faraday rotation coefficient $\theta_F$ and the anisotropy field $H_A$ caused by the crystalline anisotropy are increased by the partial substitution of Co and La for Ba and Fe, respectively.

A representative magneto-optical recording material according to the present invention is a material having the following formula:

$$Ba_{1-x}La_xCo_yFe_{12-y}O_{19} \quad (I)$$

wherein $0 < x < 1$, $x \simeq y$. In the above, even if x is not exactly equal to y, the object of the present invention can be attained.

By further replacement of part of Fe with Co, and part of Ba with La, for example, as shown in the following formulas (II) and (III), the properties of the magneto-optical recording material can be controlled within the scope of the object of the present invention.

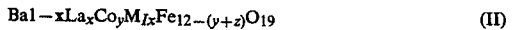

$$Ba_{1-x}La_xCo_yM_{Ix}Fe_{12-(y+z)}O_{19} \quad (II)$$

wherein $0 < x < 1$, $0 < z \leq 6$, $M_I$ represents a metal element having 4 or more valences.

When $M_I$ is a 4-valence metal element, $y \simeq x + z$.
When $M_I$ is a 5-valence metal element, $y \simeq x + 2z$.
When $M_I$ is a 6-valence metal element, $y \simeq x + 3z$.

Examples of the 4-valence metal element are Ti, W, Zr, Hf, Ru, Os, Ir and Pt. Examples of the 5-valence metal element are Ta, Nb and V. An example of the 6-valence metal element is Mo.

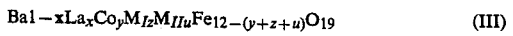

$$Ba_{1-x}La_xCo_yM_{Iz}M_{IIu}Fe_{12-(y+z+u)}O_{19} \quad (III)$$

wherein $0 < x \leq 1$, $0 < z \leq 6$, $0 < u \leq 6$, $M_I$ represents a metal element having 4 or more valences, and $M_{II}$ represents a metal element having 3 valences.

When $M_I$ is a 4-valence metal element, $y \simeq x + z$.
When $M_I$ is a 5-valence metal element, $y \simeq x + 2z$.
When $M_I$ is a 6-valence metal element, $y \simeq x + 3z$.

Examples of the 4-valence metal element are Ti, W, Zr, Hf, Ru, Os, Ir and Pt. Examples of the 5-valence metal element are Ta, Nb and V. An example of the 6-valence metal element is Mo. Examples of the 3-valence metal element represented by $M_{II}$ are Ga, Al, In, Sc and Cr.

The magneto-optical recording material having the formula (II) has not only the same properties as those of the magneto-optical recording material having the formula (I), but also the properties that the magnetic anisotropy decreases as z in the formula increases, but the magneto-optical effect increases since the content of Co increases as z in the formula increases.

In the case of the magneto-optical recording material having the formula (III), the Curie temperature Tc and the saturation magnetization Ms decrease due to the replacement with $M_{II}$. Because of the decrease of the Curie temperature Tc, when the magneto-optical recording material is employed in a magneto-optical memory device, the recording sensitivity is improved. Moreover, when the saturation magnetization Ms decreases, the demagnetizing field ($4\pi$ Ms) also decreases. As a result, the Mr/Ms ratio of the hysteresis loop which is not subjected to demagnetizing field correction is also improved. Since the magneto-optical effect, in particular, the Faraday rotation ($\theta_F$), is predominantly governed by the content of Co, the magneto-optical effect ($\theta_F$) does not change even when the saturation magnetization Ms decreases. Therefore, by decreasing Ms, not only the rectangular ratio, but also the read-out performance (Mr/Ms)$\times \theta_F$ is improved.

Examples of a magneto-optical recording medium in which a magneto-optical recording material according to the present invention is employed will now be explained.

A simplest example of such a magneto-optical recording medium consists of an appropriate substrate and a film magnetized perpendicular to the film plane thereof made of the magneto-optical recording material which serves as a recording layer, formed on the substrate. It is preferable that a reflection layer for utilizing reflected light, a guide track for guiding laser beams, and an undercoat layer for improving the crystalline orientation of the film magnetized perpendicular to the plane thereof be provided. Therefore, a preferable magneto-optical recording medium comprises a substrate with a guide track formed thereon, an undercoat layer formed on the substrate, a recording layer formed on the undercoat layer, and a reflection layer formed on the recording layer.

The following is a specific example of a magneto-optical recording medium in which a magneto-optical recording material according to the present invention is employed.

EXAMPLE 1

Figure 3:
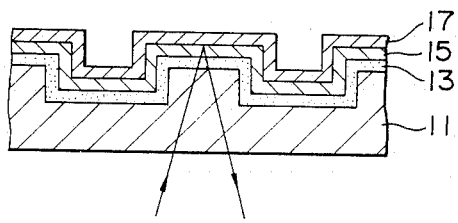
FIG. 3 is a schematic sectional view of a magneto-optical recording medium.
Figure 4:
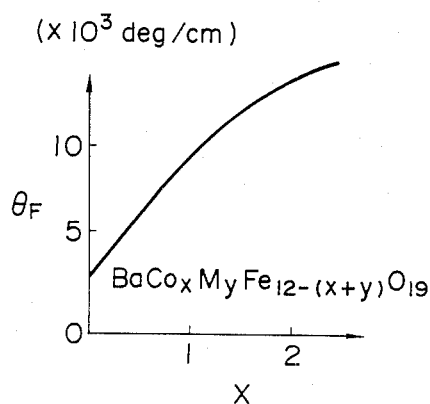
FIG. 4 is a graph showing the relationship between the Faraday rotation coefficient ($\theta_F$) and the substitution number (x) of a conventional magneto-optical recording material.
Figure 5:
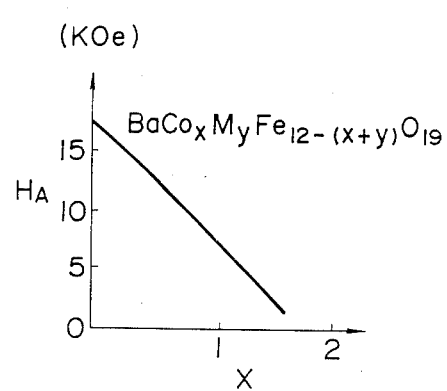
FIG. 5 is a graph showing the relationship between the anisotropy field ($H_A$) caused by the crystalline anisotropy and the number of substitution (x) of a conventional magneto-optical recording material.
Figure 6A:
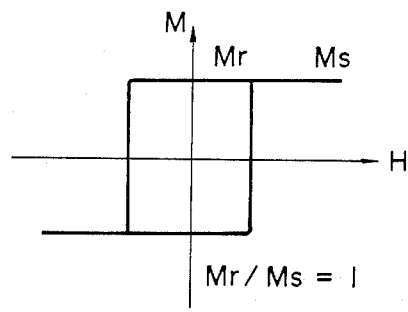
FIG. 6A shows the Mr/Ms ratio of an ideal hysteresis loop.
Figure 6B:
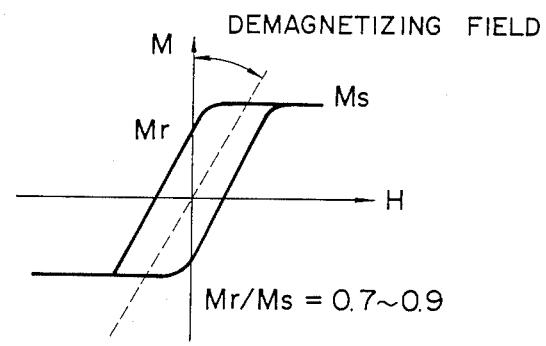
FIG. 6B shows the Mr/Ms ratio of the hysteresis loop of $BaFe_{12}O_{19}$.
Figure 6C:
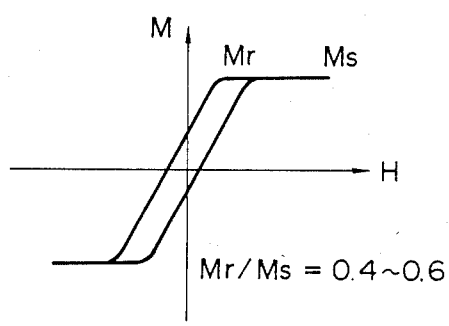
FIG. 6C shows the Mr/Ms ratio of the hysteresis loop of a representative $BaCo_xM_yFe_{12-(x+y)}O_{19}$.

As shown in FIG. 3, on a substrate 11 made of quartz having a thickness 1.2 mm, there was formed a guide track having a track pitch of 1.6 $\mu$m, a width of 0.4 $\mu$m and a depth of 0.07 $\mu$m by the conventional dry etching method.

A C-axis orientation film made of zinc oxide having a thickness of 0.1 μm serving as an undercoat layer 13 was formed on the above prepared substrate by the conventional D.C. magnetron sputtering method under the conditions that the substrate temperature was 400° C., Ar gas pressure, $1\times 10^{-3}$ Torr and $O_2$ gas pressure, $1\times 10^{-3}$ Torr.

On the above undercoat layer 13, there was formed a recording layer 15 made of a C-axis orientation film of $Ba_{0.6}La_{0.4}Fe_{11.6}O_{19}$ having a thickness of 0.4 μm by the conventional target facing type of D.C. sputtering method under the conditions that the substrate temperature was 650° C., Ar gas pressure, $0.8\times 10^{-3}$ Torr and $O_2$ gas pressure, $0.2\times 10^{-3}$ Torr.

On the above recoding layer 15, there was formed a reflection layer 17 made of Au having a thickness of 0.07 μm by the conventional electron beam evaporation method, whereby a magneto-optical recording medium was fabricated.

COMPARATIVE EXAMPLE

Example 1 was repeated except that the recording layer 15 employed in Example 1 was replaced by a recording layer consisting of $BaFe_{12}O_{19}$ having a thickness of 0.4 μm, whereby a comparative magneto-optical recording medium was fabricated.

The magneto-optical characteristics of the above two magneto-optical mediums, namely, Hc, Mr/Ms ratio, magneto-optical effect and reproduction carrier/noise ratio C/N, were compared. The results were as follows.

| Sample | Characteristics | | | |
|---|---|---|---|---|
| | Hc (kOe) | Rectangular Ratio | Magneto-Optical Effect (Rotation Angle) (deg) | Reproduction C/N (dB) |
| Example 1 | 3.8 | ≃1.0 | 0.5 | 48 |
| Comparative Example | 3.1 | 0.88 | 0.2 | 39 |

In the above, the reproduction of C/N ratio was measured under the conditions that recording frequency (f) was 1.5 MHz, line speed, 3 m/s and the band width, 30 kHz.

Recording of information in the above magneto-optical recording mediums and reproduction of the recorded information from the recording medium can be performed in the same manner as in the case in the conventional magneto-optical medium by projecting modulated or polarized laser beams to the recording layer. More specifically, recording of information is performed by selectively projecting laser beams to the recording layer under application of a magnetic film, thereby heating the laser beam projected portion to a temperature above the Curie Temperature so as to decrease the coercive force to reverse the magnetization in the projected portion, so that the recording bits are formed. When the thus recorded information is read out, polarized laser beams are projected to the recording layer so that the direction of the Faraday rotation is detected.

According to the present invention, a magneto-optical recording material having great magneto-optical effect and crystalline anisotropy can be obtained. By use of this magneto-optical recording material, in a recording layer of a magneto-optical recording medium, a magneto-optical recording medium which is improved with respect to the reading-out performance in recording stability can be obtained.

What is claimed is:

1. A magneto-optical recording material consisting of magnetoplumbite type ferrite containing barium in which part of Ba is replaced by La and part of Fe is replaced by Co, wherein said barium magnetoplumbite type ferrite has the following formula:

$$Ba_{1-x}La_xCo_yFe_{12-y}O_{19}$$

wherein $0<x<1$, $x\simeq y$;
or has the following formula:

$$Ba_{1-x}La_xCo_yFe_{12-(y+z)}O_{19}$$

wherein $0<x<1$, $0<z<6$, $M_I$ represents a metal element having 4, 5 or 6 valences, wherein when $M_I$ is a 4-valence metal element, $y\simeq x+z$, when $M_I$ is a 5-valence metal element, $y\simeq x+2z$, and when $M_I$ is a 6-valence metal element, $y\simeq x+3z$;
or has the following formula:

$$Ba_{1-x}La_xCo_yM_{Iz}M_{IIu}Fe_{12-(y+z+u)}O_{19}$$

wherein $0<x<1$, $0<z<6$, $M_I$ represents a metal element having 4, 5 or 6 valences, and $M_{II}$ represents a metal element having 3 valences, wherein when $M_I$ is a 4-valence metal element, $y\simeq x+z$, when $M_I$ is a 5-valence metal element, $y\simeq x+2z$, and when $M_I$ is a 6-valence metal element, $y\simeq x+3z$.

2. The magneto-optical recording material as claimed in claim 1, wherein said magnetoplumbite type ferrite has the following formula:

$$Ba_{1-x}La_xCo_yFe_{12-y}O_{19}$$

wherein $0<x\leq 1$, $x\simeq y$.

3. The magneto-optical recording material as claimed in claim 1 has the following formula:

$$Ba_{1-x}La_xCo_yM_{Iz}Fe_{12-(y+z)}O_{19}$$

wherein $0<x<1$, $0<z\leq 6$, $M_I$ represents a metal element having 4, 5 or 6 valences, wherein when $M_I$ is a 4-valence metal element, $y\simeq x+z$, when $M_I$ is a 5-valence metal element, $y\simeq x+2z$, and when $M_I$ is a 6-valence metal element, $y\simeq x+3z$.

4. The magneto-optical recording material as claimed in claim 1 has the following formula:

$$Ba_{1-x}La_xCo_yM_{Iz}M_{IIu}Fe_{12-(y+z+u)}O_{19}$$

wherein $0<x<1$, $0<z\leq 6$, $M_I$ represents a metal element having 4 or more valences, and $M_{II}$ represents a metal element having 3 valences, wherein when $M_I$ is a 4-valence element, $y\simeq x+z$, when $M_I$ is a 5-valence metal element, $y\simeq x+2z$, and when $M_I$ is a 6-valence metal element, $y\simeq x+3z$.

5. The magneto-optical recording material as claimed in claim 3, wherein said 4-valence metal element is selected from the group consisting of Ti, W, Zr, Hf, Ru, Os, Ir and Pt, said 5-valence metal element is selected from the group consisting of Ta, Nb and V, and said 6-valence metal element is Mo.

6. The magneto-optical recording material as claimed in claim 4, wherein said 4-valence metal element is selected from the group consisting of Ti, W, Zr, Hf, Ru, Os, Ir, Pt, and said 3-valence metal element represented by $M_{II}$ is selected from the group consisting of Ga, Al, In, Sc and Cr.

* * * * *